United States Patent [19]
Srivastava

[11] Patent Number: 5,999,737
[45] Date of Patent: Dec. 7, 1999

[54] LINK TIME OPTIMIZATION VIA DEAD CODE ELIMINATION, CODE MOTION, CODE PARTITIONING, CODE GROUPING, LOOP ANALYSIS WITH CODE MOTION, LOOP INVARIANT ANALYSIS AND ACTIVE VARIABLE TO REGISTER ANALYSIS

[75] Inventor: Amitabh Srivastava, Menlo Park, Calif.

[73] Assignee: Digital Equipment Corporation, Houston, Tex.

[21] Appl. No.: 08/963,087

[22] Filed: Nov. 3, 1997

Related U.S. Application Data

[63] Continuation of application No. 08/752,728, Nov. 19, 1996, abandoned, which is a continuation of application No. 08/204,833, Mar. 1, 1994, abandoned.

[51] Int. Cl.[6] .................................................. G06F 9/44
[52] U.S. Cl. ..................... 395/709; 395/710; 395/708; 395/707; 395/705
[58] Field of Search ................................. 395/709, 710, 395/708, 707, 705

[56] References Cited

U.S. PATENT DOCUMENTS

| | | | |
|---|---|---|---|
| 4,667,290 | 5/1987 | Goss et al. | 364/300 |
| 5,161,216 | 11/1992 | Peps et al. | 395/375 |
| 5,175,856 | 12/1992 | Van Dyke et al. | 395/700 |
| 5,179,702 | 1/1993 | Spix et al. | 395/650 |
| 5,201,050 | 4/1993 | McKeeman et al. | 395/700 |
| 5,212,794 | 5/1993 | Pettis et al. | 395/700 |
| 5,276,881 | 1/1994 | Chan et al. | 395/700 |
| 5,327,561 | 7/1994 | Choi et al. | 395/700 |

OTHER PUBLICATIONS

New Optimizations for PA–RISC compliers Robert C. Hansen, Jun. 1992.
Compliers Principles, Techniques and Tools, Sept. 1985.
Moher, T., "Provide: A Process Visualization and Debugging Environment", IEEE Transactions on Software Engineering, vol. 14, No. 6, Jun. 1988.

*Primary Examiner*—Tariq R. Hafiz
*Assistant Examiner*—Todd Ingberg
*Attorney, Agent, or Firm*—Jenkens & Gilchrist, P.C.

[57] ABSTRACT

A computer system is directed to convert a program written as a plurality of high level source code modules into corresponding machine executable code. The source code modules are compiled into an object code module, and the object code modules are translated into a single linked code module in the form of a register translation language and logical symbol table compatible with a plurality of computer system hardware architectures. The source code program structures are recovered from the linked code module, and the linked code module is partitioned into a plurality of procedure, and instructions of each of the procedures grouped into basic blocks. A procedure flow graph is constructed for each of the procedures, and a program call graph is constructed for the linked code module. The linked code module is modified by eliminating dead code and moving loop-invariant code from loops. The modified linked code is converted into machine executable code compatible with a target one of said plurality of computer system hardware architectures.

23 Claims, 9 Drawing Sheets

LINK TIME OPTIMIZATION VIA DEAD CODE ELIMINATION, CODE MOTION, CODE PARTITIONING, CODE GROUPING, LOOP ANALYSIS WITH CODE MOTION, LOOP INVARIANT ANALYSIS AND ACTIVE VARIABLE TO REGISTER ANALYSIS

This application is a continuation of application Ser. No. 08/752,728, filed on Nov. 19, 1996, which was abandoned upon the filing hereof, which is a continuation of application Ser. No. 08/204,833, filed Mar. 1, 1994, now abandoned.

FIELD OF THE INVENTION

This invention relates generally to converting a computer programs written in a high level language into machine executable code, and more particularly to converting the program to produce optimized machine executable code.

BACKGROUND OF THE INVENTION

Processes to be performed by computer systems are typically defined in high level source language programs. Compilers, linkers, and assemblers may be used to convert the source language programs to machine executable code. The utilization of computer resources can be minimized if the machine code is optimized for execution.

Optimizing the machine executable code has conventionally been the domain of the compiler. This is sensible; it is the compiler that generates machine compatible object code. Furthermore, the compiler begins with the original source program written in the high level language by the programmer. Therefore, the intent of the programmer is exposed to the compiler. The source code typically includes directions about the type of variables declared and the use of high level operations. The source code may also include pragma added by the programmer to streamline the conversion from source to executable code. Nonetheless, most conventional compilers include limitations which produce non-optimal machine code. Non-optimal code degrades performance of the program during execution and wastes valuable computer system resources such as instruction cycles and storage space in memory.

In most environments, a large program is written as many smaller source code modules using an editor. Smaller source modules are easier to understand and manage. The source modules are then compiled into object modules, typically, one source module at the time. This separate compilation would be difficult to eliminate, since it greatly reduces the turn-around time in the multiple edit-compile-build-run-debug cycles that are so characteristic of computer program development.

However, since the compiler only operates on one module at the time, optimization is limited to the module being compiled. Thus, the compiler cannot view the behavior of the entire program to eliminate, perhaps, duplicate procedures in different source modules. Also, the linker may acquire object or assembly code from standard libraries. Clearly, traditional compile-time optimization can not optimize the pre-compiled library modules.

In addition, the compiler can not determine the actual use, or for that matter non-use, of variables declared in one module, for use in another module. It is also difficult for the compiler to determine if memory and registers will be fully utilized during execution.

Moreover, most compilers convert source code modules in distinct phases. For example, retargetable compilers, for generating machine executable code for different computer hardware architectures, may have machine-independent phases insulated from machine-dependent phases. The optimization methods may therefore not have a complete view of the resources that will be available during execution.

In many computer environments, the compiler produces assembly code rather than true object code. The advent of reduced instruction set computing (RISC) architectures has led to environments in which the assembly code is no longer isomorphic with the object code, and optimization below the level of assembly code is not possible by the compiler.

There are some systems which attempt post-compiler or "late" code modifications. The known modifications typically are limited to patching linked code for instrumentation. Patching is the insertion of specific instructions at known locations. "Instrumentation" refers to the patching of the program for the purpose of measuring and tracing the flow of the program while executing. During instrumentations, the memory addresses of relocated instructions are carefully tracked, and references to any relocated memory locations are accordingly adjusted. However, the problems associated with late code modification have generally inhibited aggressive optimization of linked code.

There may be additional advantages in optimizing linked code. It is not until the object modules are linked together that the gross morphology of the entire program becomes visible. Although some of the high-level structure is missing from the linked object modules, link-time optimization may have other properties not available to compile-time optimization.

At link-time the entire program, including library modules is available. Thus, the entire program can be scrutinized for optimization opportunities, rather than isolated opportunities just within single and separately compiled source code modules. Also, at link time, the output of the compiler, e.g., the object code, can be examined. This may not have been done by the compiler. These link-time properties can lead to several advantages which are exploited by the invention to optimize the executable code to a level not previously achievable by compilers.

SUMMARY OF THE INVENTION

A computer system is directed to convert a program written as a plurality of source code modules into corresponding machine executable code for executing in a target computer system. Each of the source code modules, written in a high level source language, is compiled into an object code module. The object code modules are translated into a single linked code module in the form of a register translation language and logical symbol table. The register transfer language is independent of any particular computer system hardware architectures. The original high level program structures are recovered from the linked code module and the linked code module is partitioned into a plurality of procedure, and instructions of each of the procedures are grouped into basic blocks. Basic blocks are classified as normal blocks if they only manipulate data, and basic blocks are classified as control blocks if they change the flow of execution control.

In accordance with another aspect of the invention, a procedure flow graph is constructed for each of the procedures, and a program call graph is constructed for the linked code module. The procedure flow graphs to indicate the execution flow within the procedures, and the program call graph to indicate the execution flow among the procedures. The linked code module is converted into machine executable code compatible with a target computer system hardware architectures.

In the invention, the linked code module is optimized before the machine code is generated. A liveliness analysis is performed for each of the basic blocks of each of the procedures. The liveliness analysis determines a first set of variables which are live at the beginning of execution of each of the basic blocks, and a second set of variables which are live at the end of execution of each of the basic blocks. The first and second set of variables are used to locate dead-code which can be removed from the linked code module. In addition, intra-procedural and inter-procedural loop invariant code are moved across procedures boundaries to minimize the execution time of loops.

DETAILED DESCRIPTION OF A PREFERRED EMBODIMENT

Figure 1:
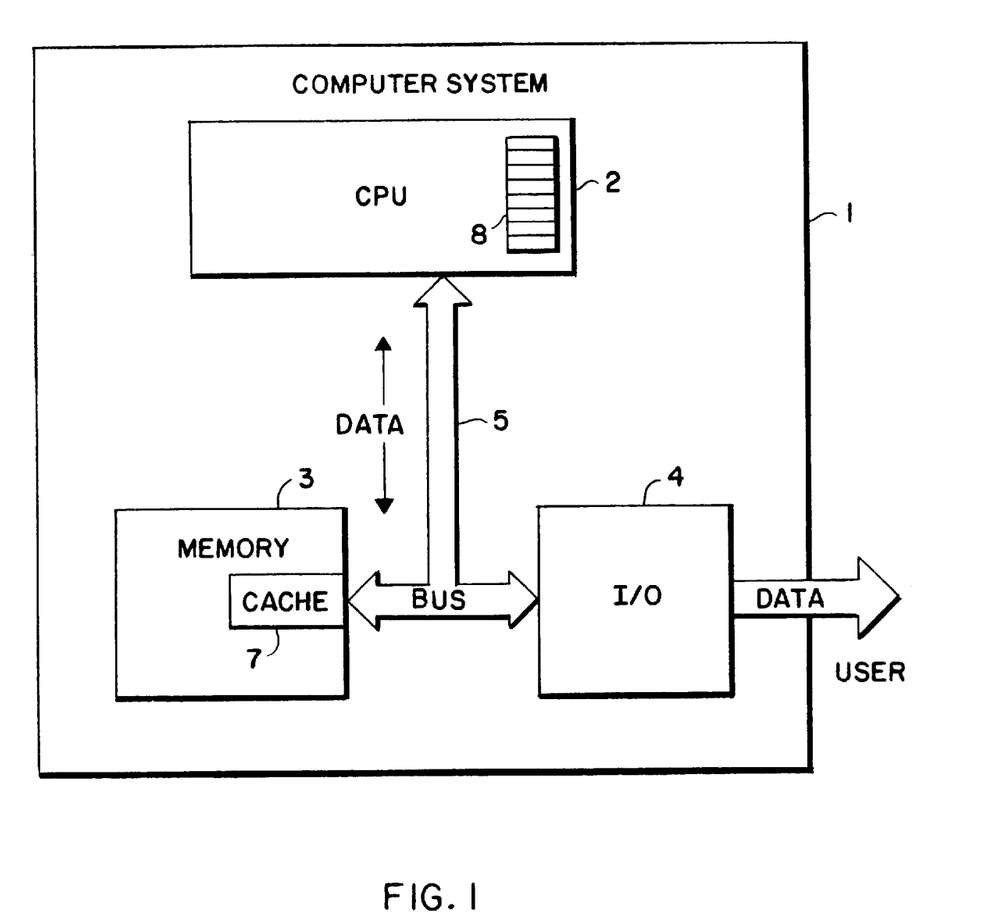
FIG. 1 is a block diagram of a computer system which can use the link-time optimizer of the present invention.

FIG. 1 shows a computer system 1 including a CPU 2, a memory 3, and an I/O 4 coupled to each other by a bus 5. The computer system 1 can be a personnel computer, a work-station, a main-frame, or part of a network of computers executing process steps independently, or in parallel.

With respect to the component structures of the computer system 1, the CPU 2 may be of a variety of architectures, CICS, RISC and the like. The memory 3 can include a cache 7 to accelerate the data flow between the CPU 2 and the memory 3. The structure of the bus 5 is general, and can include dedicated high-frequency data paths, signaling in parallel, for example between the cache 7 and the CPU 2. The I/O 4 can include input and output interfaces for acquiring and distributing data.

During operation of the computer system 1, data and processing steps, in the form of machine executable machine code, are acquired by the CPU, usually from the memory 3 via the bus 5. The data and the executable code are usually permanently retained by the I/O 4, and loaded into the memory 3 as needed. While processed by the CPU 2, the data can be stored in a set of registers 8.

Figure 2:
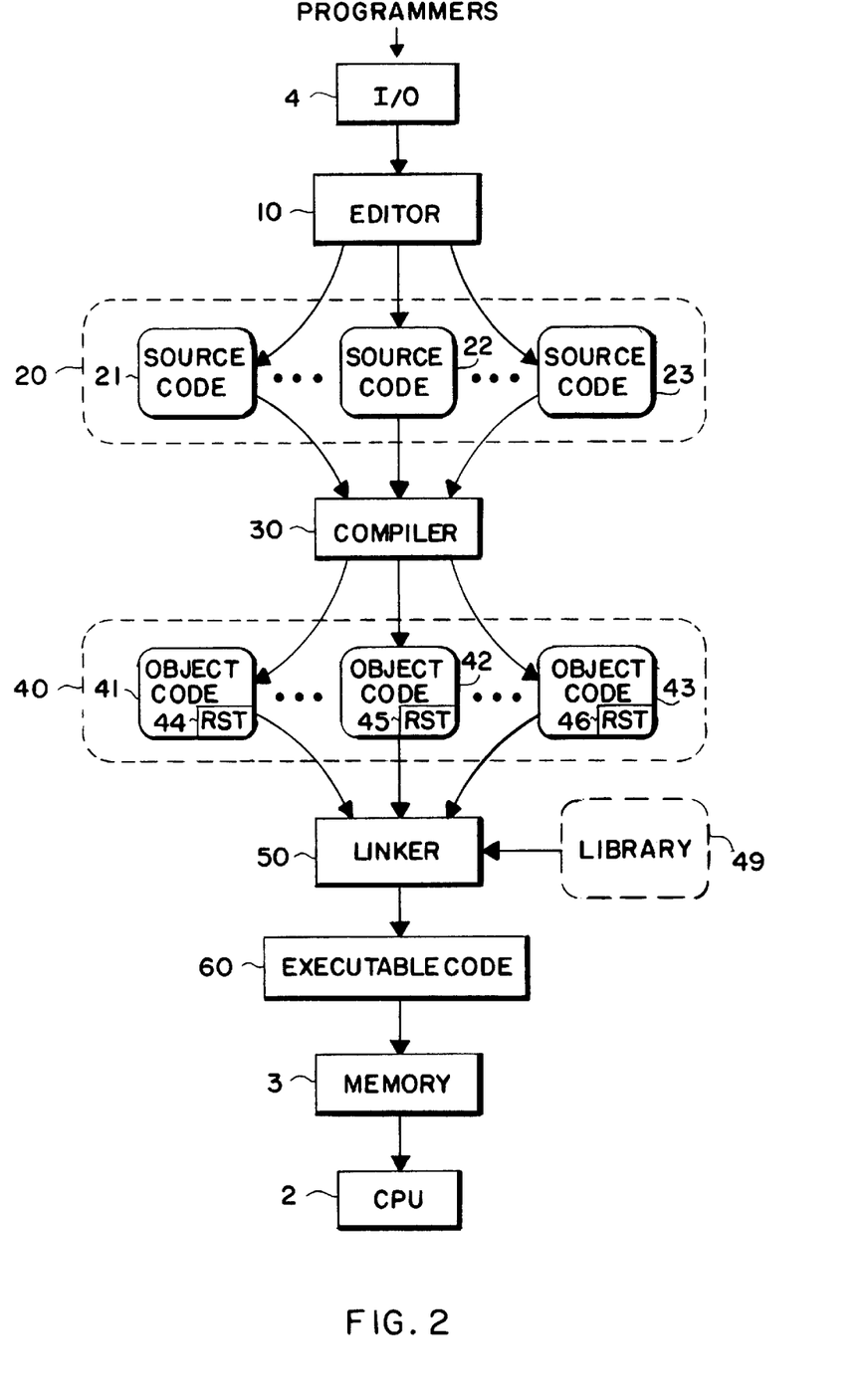
FIG. 2 is a top level flow diagram of a procedure to produce optimized machine executable code for the computer system of FIG. 1.

FIG. 2 show the general process of generating optimized machine executable code. Programmers, typically, via the I/O 4, create a program 20 written in a high-level machine-independent language using an editor 10. If the program 20 is very large, the program 20 is created as a library or collection of smaller programs, usually called source code modules 21–23. Editing smaller programs is more efficient than working on one large and very complex program.

The source code modules 21–23 are processed by a compiler 20 to create a collection of object modules 41–43. Usually, there is a one-to-one correspondence between the source modules and the object modules. Each of the object module 41–43 can be associated with corresponding relocation and symbol tables (RST) 44–46. The RSTs 44–46 typically are used to resolve memory address assignments during linking.

A linker 50 embodying the invention can combine the object modules 41–43, and resolve logical to physical address translations at link-time with the associated RST 44–46. The linker 50 may also acquire pre-compiled code modules from a library 49. The library 49 includes, for example, frequently used or standard program segments or procedures. The linker 50 produces machine dependent executable code 60 which can be loaded in the memory 3 for subsequent execution by the CPU 2 of the computer system 1 of FIG. 1.

Most know compilers attempt to optimize the object code generated. Compiler optimizing techniques are widely known, and take many forms. However, optimization by a compiler suffers. Global information which could further reduce resource requirements at execution time is general not specified in the individual object modules. The complexities of aggressively modifying linked object code have minimized the number of systems that are known for performing post-compiler object code manipulation.

Figure 3:
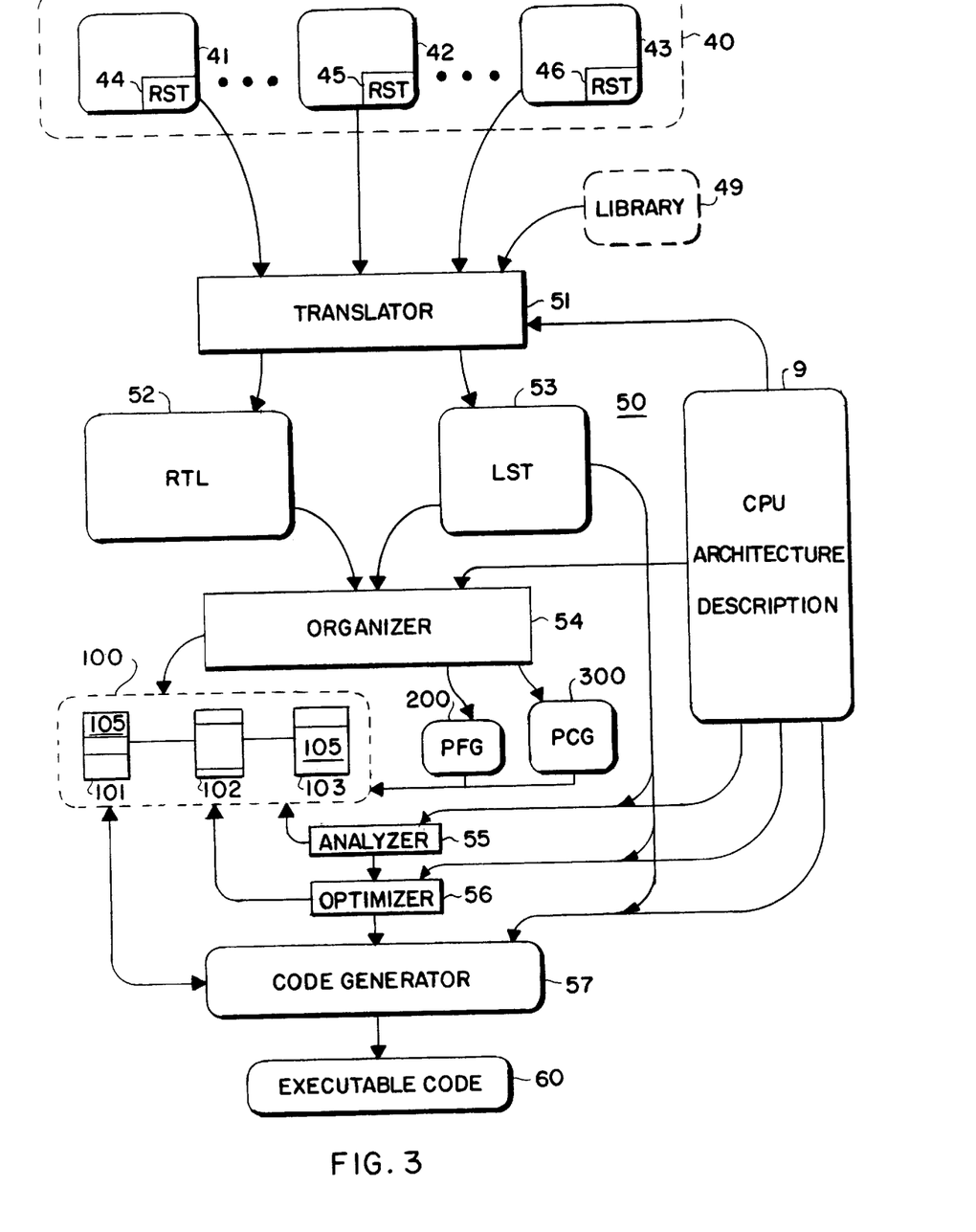
FIG. 3 is a flow diagram of a link-time optimizer according to a preferred embodiment of the invention.

FIG. 3 is a flow diagram of the optimization process of the invention performed by the optimizing linker 50 of FIG. 2. The linker 50 includes a translator 51, an organizer 54, an analyzer 55, an optimizer 56, and a code generator 57.

First as a brief introduction, object modules 41–43 and library modules 49 are processed by the optimizing linker 50 in separate phases. During an initial phase, the translator 51 transforms the collection of object modules 40 and any optional library modules 49 into a single linked code module 52.

The linked code module 52 is in the form of an intermediate register transfer language (RTL) having machine-independent instructions compatible with different computer systems. Specific architectures of target computer systems can be maintained in a CPU architectures description 9. The CPU description 9 may include instruction operand and operator field specifications, instruction timings such as fetch latencies and pile-line delays. The CPU description 9 can also describe cache, memory, and register characteristics, including addressing schemes. The CPU description 9 can also be used to translate object code to RTL and RTL to machine executable code.

The translator 51 also transforms all object code operand addresses into symbolic addresses. The relocation tables and the symbol tables 44–46 are likewise transformed into a logical symbol table (LST) 53. The linked code module 52, the LST 53, and the CPU architecture description 9 can be stored in the memory 3.

The organizer 54 partitions the linked code 52 into a collection of procedures 100. Each of the procedures 101–103 includes instructions which are related during execution. Furthermore, the instructions in each of the procedures 101–103 are organized into basic execution blocks, for example basic blocks 105. A "basic block" is a sequence of instructions which are all executed if the first instruction of the sequence is executed. Basic blocks 105 can be classified as either "normal" blocks or "control" blocks. A normal block merely manipulates data, control blocks do not manipulate data, they alter the flow of execution.

The organizer 54 builds procedure flow graphs (PFG) 200 and a program call graph (PCG) 300 in the memory 3. For each of the procedures 101–103, the PFG 200 maps the flow of control through the basic blocks 105 of the corresponding procedure during execution. The PCG 300 indicates how the procedures are called by each other. The graphs 200 and 300 are described in greater detail with reference to FIG. 4.

The analyzer 55 examines the RTL linked code 52 for optimizing opportunities with the aid of the LST 53, the PFG 200, and the PCG 300. The optimizer 56 performs the actual optimization by adding, deleting, and moving instruction, even across procedures boundaries, without concern for the target hardware architecture.

The code generator 57 generates machine-dependent code for the target hardware architecture. All symbolic addresses are resolved and recomputed because instructions may have been moved, altered, and deleted. Delays may need to be introduced into the executable code for certain architectures, for example RISC architectures executing instructions in parallel. Other code may have to be rescheduled for execution to remove the possibility of pipeline hazards and execution stalls. It should be noted that the machine executable code 60 produced by the code generator 57 may be compatible with the assembly language of the object modules 41–43, or a completely different target architecture described in the CPU description 9.

Now a more detailed description of the preferred embodiment of the optimizing linker 50 is given. During an initial phase of the linker 50, the translator 51 converts the object modules 41–43 and any selected modules of the library 49 to the linked module 52 in an intermediate language form. The intermediate representation of the program is in the form of the register transfer language and the logical symbol table 51. The RTL is machine-independent In the preferred embodiment of the invention, the RTL has been oriented for reduced instruction set computing (RISC) architectures.

The RTL includes generic instructions such as "add" and "sub" that operate on registers and constants. Only the "load" and "store" instructions access the memory. Procedure calls in the RTL are simple transfers of control instructions, for example "jump," and any parameters passed upon transfers of control are explicitly exposed. Unlike traditional machine code, the RTL assumes an infinite set of registers, with some of the registers possibly having dedicated functions, for example, floating point arithmetic and a stack-pointer (SP) and a program counter (PC).

All operand address references in the RTL linked code 52 are symbolic. For example, addresses expressed relative to the PC are converted to targets which are labels in the logical symbol table 53. Similarly, all references to memory areas are converted to symbolic memory references. Converting all addresses to symbolic form has the advantage of enabling unconstrained movement and modification of the instructions of the linked module 52 during subsequent phases of the optimizing linker 50.

During transformation, the translator 51 may recover some of the structure of the original source modules so that the link-time optimizer can have as much information as the compiler 30 did. For example, the translator 51 searches the linked code 52 for what were source-level case-statements. Typically, a case-statement is compiled into object code as an indirect "jump" through some address stored in a jump table. The off-set of the stored address in the jump table is usually indexed by the case index value. The jump table for case-statements is usually stored in a read-only area of the memory 3 with the addresses of different jump targets stored in successive memory locations. This makes it possible to recognize case-statements in the object code. The address of the jump table can be obtained by examining the case-statement object code.

By identifying all of the case-statements in a program, the jump table can be partitioned into a set of smaller jump tables of a known size. This in turn reveals all possible jump destinations. The table size may be cross-checked against the part of the case-statement object code which checks the range of the index value. Recovering case statements facilitate the construction of the graphs 200 and 300.

Certain machine executable instructions such as "load-address" and double-precision "loads" and "stores" are usually expressed in the object code as sequences of simpler instructions. Recognizing such simpler instructions allows optimization of the eventual machine code in ways not possible with conventional linkers and assemblers. The relocation and symbol tables 44–46 are helpful in reassociating the parts of a "load-address" operation since the instruction fields that are combined to make up the address must be marked for relocation.

However, double-precision "loads" and "stores" require some additional work. A double-precision access is really two single accesses to an even/odd register referencing adjacent memory addresses. Since the double-precision access occurs in an even/odd pair, the odd double-precision register of a "load" instruction is used as a starting point. A search is made for the matching object code instruction which must use the conjugate even double-precision register and must address the adjoining memory location.

The linked module 52 of the preferred embodiment does not use delayed "branch" instructions typically found in programs using parallel execution mechanisms. Instructions which occupy a delay slot in the object code are moved out of sequence. If the delay slot is filled only with instructions which normally are executed prior to the branch, they can be restored. If the instructions in the delay slot change a register used by the branch it is incorrect to restore the instructions. Instead, in the linked module 52, the branch slot is duplicated and pushed ahead to both the destination address and the fall-through address. If the instructions in the delay slot are never executed, or "dead-code" they do not need to be duplicated.

In the next phase, the organizer 54 of the linker 50, partitions the linked module 52 into the collection of procedures 100. Instructions in each of the procedures 101–103 are further grouped into basic blocks 105. The procedure flow graph 200 is built for each procedure, and the complete program call graph 300 is build for the entire program. These execution control structures are used during the subsequent analyzing and optimizing phase. For example, the optimizing linker 50 can measure the quantity of code which is not directly addressable.

The linked module 52 reveals optimization opportunities which would not have been visible to the compiler. Moreover, by having the linked code 52 in RTL form, code modification can be performed aggressively, and in a manner not possible by traditional optimizing compilers. Instructions of the RTL linked code 52 can be freely moved and deleted to minimize the use of system resources such as general purpose registers, cache memory, and execution cycles.

The optimizer 56, according to the principles of the invention, can perform optimization among procedures (inter-procedural optimization), and optimization within a procedure (intra-procedural optimization). Loop-invariant code can be moved across procedure boundaries. Dead-code can be expunged. Redundant register-to-register copies and duplicate save/stores can be reduced.

One optimizing method used by the optimizer 56 removes invariant codes from execution loops. Loops are defined as any repeated execution of instructions by either iteration or recursion. "Invariant code" are instructions which do not change the execution state of the computer system 1 during the execution loop. In other words, invariant code does not alter data. Removing the invariant code form the loop shortens the loop and lessens execution time. As an advantage of the invention, the link-time optimizer detects execution loops which span object modules. Such execution loops go undetected by traditional compilers.

Execution loops can be deduced by iteration and recursion. Invariant code is detected by examining the operator and operands of instructions. For example, instructions which load addresses are guaranteed to be invariant. To reap the benefit of code motion, the data should be stored in a register during execution of the loop.

To locate unused register inside loops, a liveliness analysis is performed by the analyzer 55. The liveliness analysis locates registers which are not used while executing in loops. The liveliness analysis, as described herein, can also be used by compilers to simplify traditional invariant code removal.

Figure 4:
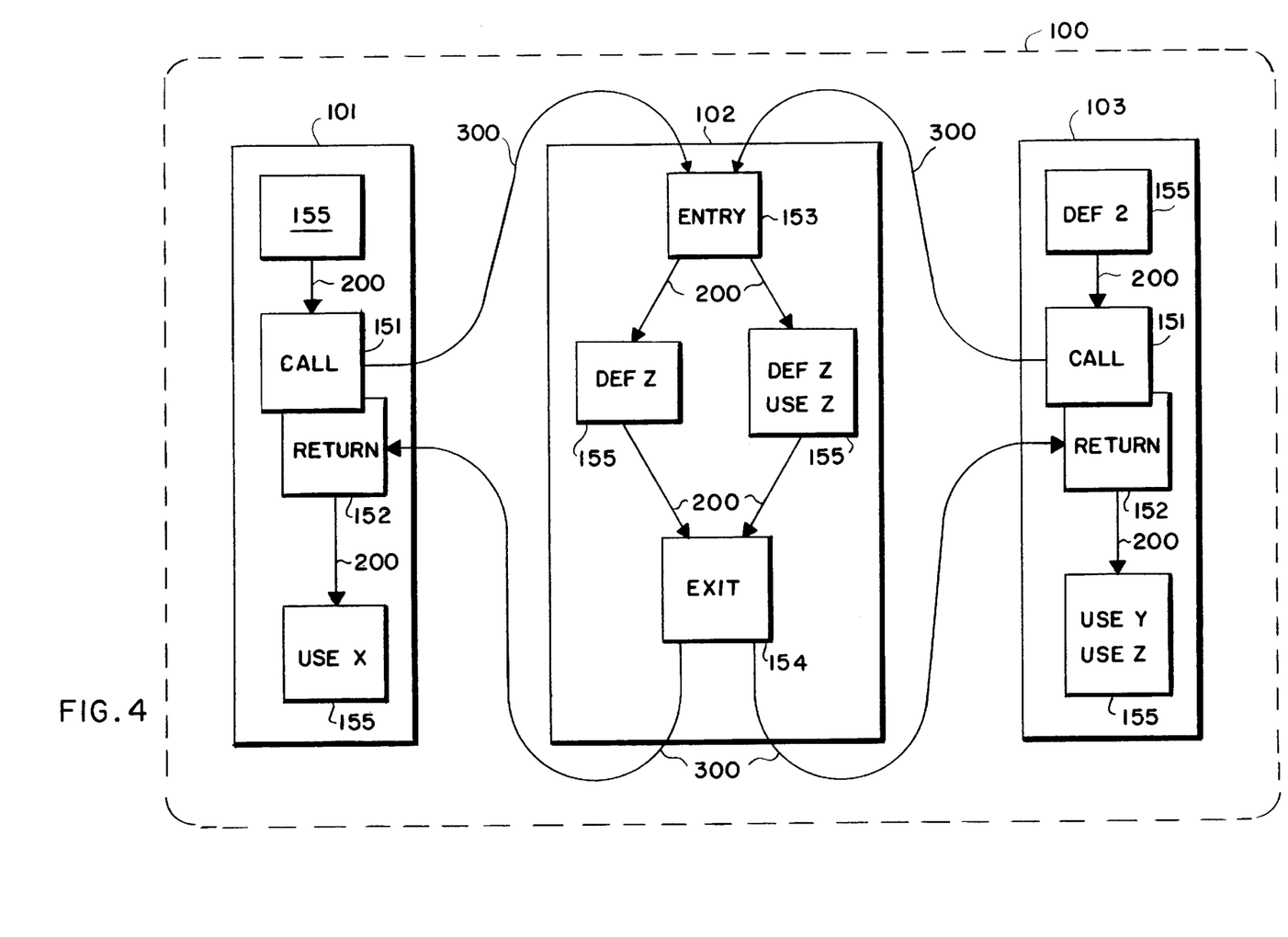
FIG. 4 shows procedure flow graphs and a program call graph superimposed on a program to be optimized by the link-time optimizer of FIG. 3.

Liveliness analysis treats the entire program, as converted into the organized linked module 100, and as described in the program call graph 300, as a single executable entity. The procedure flow graphs 200 contain sufficient information to filter the execution control to and from the procedures.

Figure 5:
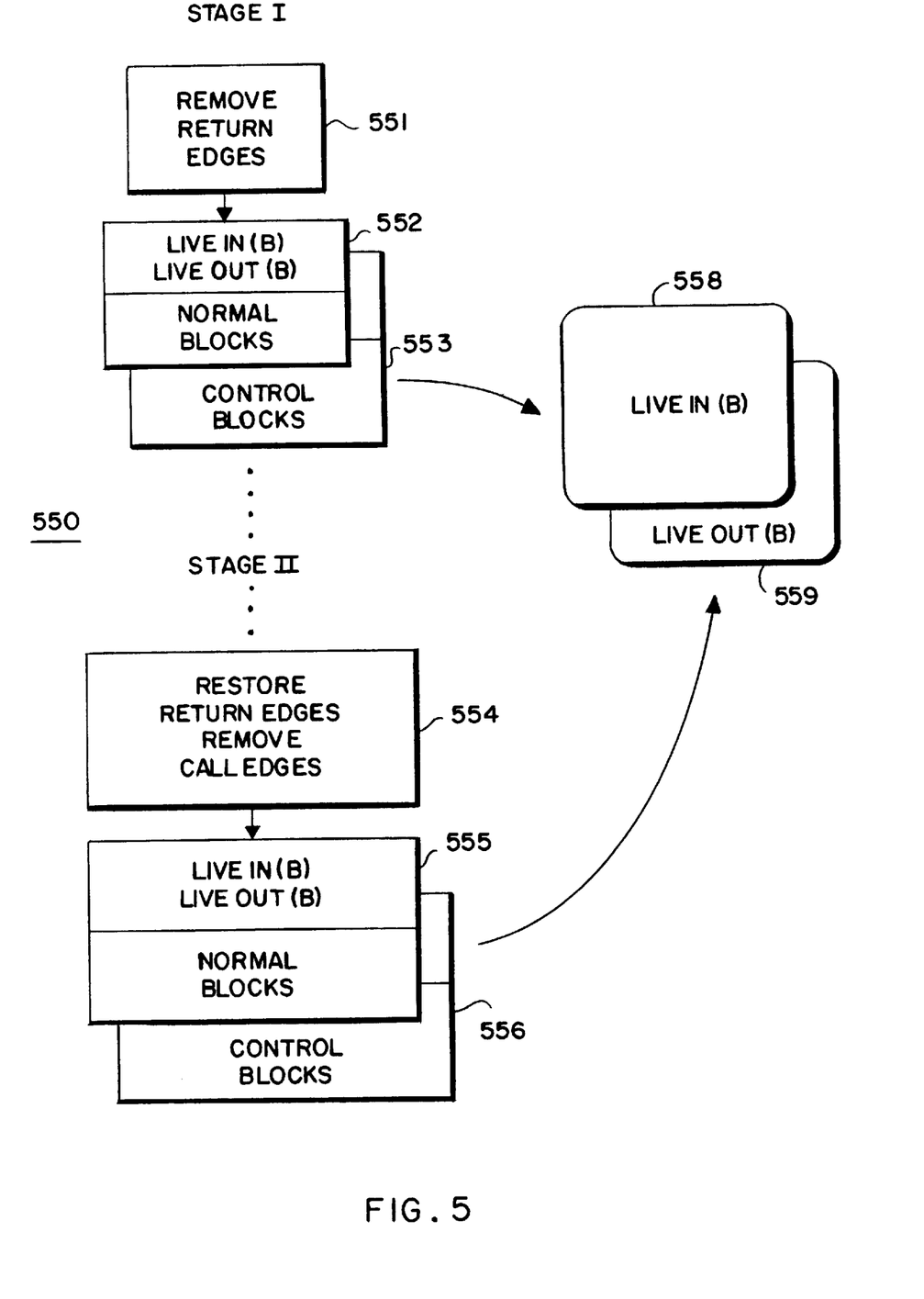
FIG. 5 is a flow diagram of a liveliness analysis procedure of the link-time optimizer.

With reference to FIGS. 4 and 5, the liveliness analysis of the analyzer 55 is now described. FIG. 4 shows the program call graph 300 imposed on the organized linked module 100, and the procedure flow graphs 200 imposed on the procedures 101–103. The procedures are partitioned into a group of basic blocks 151–155. Some of the basic blocks may be single instructions. The basic blocks are classified as either a call block 151, a return block 152, an entry block 153, an exit block 154, or a normal block 155.

The interface or edges between the procedures are 101–103 conjugate pairs of control blocks, for example, call blocks 151 and return blocks 152. The call block 151 is the last block executed in the procedure before execution control is transferred to another procedure. Upon return, the return block 152 is executed first. Each call block 151 has a single successor entry block 151 in the called procedure. The entry block is executed first when a procedure is called by another procedure of the program. Each return block 152 has a single predecessor exit block 154. The exit block 154 is the last block executed before execution control is transferred to the calling procedure. An entry block may have many predecessor blocks, likewise for successors of the exit blocks 154. The normal blocks 155 are not involved in the transfer of execution control, the normal blocks 155 define, use and consume variables and registers, for example, variables x, y, and z.

In the module 100, procedures 101 and 103 call procedure 102. Inter-procedural edges are present at the call blocks 151 and the entry blocks 153, the exit block 154 and the return blocks 153. Instructions which traditional compilers may have associated with the control blocks at the inter-procedural edges, for example instructions which pass arguments and manipulate the stack are explicitly exposed, and do not need to be considered part of the control blocks. Therefore, such instructions are assigned to normal blocks.

During the liveliness analysis, the two sets of variables, see FIG. 5, are constructed for each basic block (B), for example sets LIVEIN(B) 558 and LIVEOUT(B) 559. The set LIVEIN(B) 558 includes the variables which are live immediately before the block (B) is executed, and the set LIVEOUT(B) 559 includes variables which are live immediately after the block (B) is executed.

The whole program can be treated as one big flow graph with liveliness execution information flowing across procedure boundaries. At the entry block 153 of procedure 102 of FIG. 4, variables x and y are live, but variable z is not. Care must be taken to discount information which flows along paths which cannot be followed during actual execution. For example, there is an execution path from the call block 151 of procedure 101, through procedure 102, where y is live, to the use of y in procedure 103. However, it is imprecise to conclude that y is live in call block 151 of procedure 101, because it is meaningless to associate a call block with its conjugate return block, when the return is due to some other call.

As shown in FIG. 5, the analyzer 55 performs a rigorous liveliness analysis 550 in two stages. In the first stage, STAGE I, during step 551, all the return edges along the execution control path are removed. Then in steps 552 and 553 the procedure 550 determine the liveliness information for normal and control blocks. In a conservative liveliness analysis approach, variables are "live" if there is any possibility that they could be used in the block. They are "dead" only if there is no doubt they are not used.

The liveliness information can flow over normal edges and control edges, and from a return block to its conjugate call block. Because the return edges are deleted, information does not flow along the return path. Therefore, the first stage of liveliness analysis gives a precise, low-sensitive summary of the possible effects on the liveliness of variables of calling each procedure, including the effects on the liveliness of any calls that are made from the called procedure.

In the second stage of liveliness analysis, STAGE II, during step 554 the return edges are restored and the call edges are deleted. Then, in steps 555 and 556, which use the summary information collected in the first stage, it is determined if the variables which might be live before the call are in fact live. Because the information can flow from a calling procedure to a called procedure, and vise versa, the liveliness information as expressed in the sets LIVEIN(B) and LIVEOUT(B) is precise. An example variable liveliness analysis procedure 550 is presented in programmable form in Appendix A.

Any variables which are live when execution in any of the normal blocks 155 is completed are also live at commencement of execution of the successor block. Variables which are live, when execution in normal blocks 155 begins, include those variables which are live when execution in the blocks 155 is completed, but not necessarily set in the blocks 155, and any variables that are used in the block 155 before being set in the blocks 155.

In a preferred embodiment, a conjugate pair of call and return blocks only include instructions which cause the transfer of execution flow, these control blocks neither define nor use variables. Therefore the sets LIVEIN(B) 558 and LIVEOUT(B) 559 for call and return blocks are identical.

A variable is "live" at the start of a call block for either of two reasons; the variable is used by the called procedure, or the variable is used after the return from the called procedure. Therefore, in the first stage of liveliness analysis, liveliness information is allowed to flow to a call block both from the entry block of the procedure and from the call block's conjugate return block.

In the second stage of liveliness analysis, if liveliness information flows into the procedure from different return blocks, information flow along the call edge is cut-off and replaced with the entry set LIVEIN(B) 558 of the block as produced by the first stage. This step prevents imprecise liveliness information to flow from the return block to a non-conjugate call block.

The liveliness analysis also determines the liveliness of registers used by the procedures. Commonly, procedures save variables stored in registers when execution in the procedure is begun, for example, in a stack. The variables are restored after execution in the procedure is completed. This allows the instructions of the procedure to assign registers for unrelated uses at will. The saving, restoring, and unrelated use of registers are not considered true use for the purpose of liveliness analysis.

Indirect calls to procedures pose a special problem for inter-procedural liveliness analysis. Typically, the indirect call is via a procedure variable, the procedure variable, at different times, stores the address of an actual procedure. Indirect calls may be transformed into a direct call to an abstract procedure. The abstract procedure in turn calls each actual procedure that may be the value of the procedure variable. In the preferred embodiment, all indirect procedure calls are identified. This determination yields all values which can be assumed by the procedure variable. A conjugate call/return block pair are constructed for each value, and the pairs of conjugate blocks are combined to form the abstract procedure.

The basic blocks 151–155 of the procedures 101–103 of the program 20 are repeatedly examined during successive passes, each pass updating the information in the sets LIVEIN(B) 558 and LIVEOUT(B) 559. The final iteration is recognized when the examination reveals no further changes to the sets LIVEIN(B) 558 and LIVEOUT(B) 559.

The order in which the basic blocks are examined is complicated by the fact that the order is different in the first and second stages of the liveliness analysis. For this reason, the order of examining the basic blocks of the procedures is determined separately for each procedure using the procedure flow graphs 200. Similarly, the order of examining the procedures is determined from the program call graph 300.

In either the first or second stage, the basic blocks of each procedures are examined consecutively, in a reverse-depth-first order. In the first stage, the procedures are examined in reverse-depth-first order. This order tends to examine the called procedures before the calling procedure. In the second stage the order of examining the procedures is reversed, the basic blocks of the calling procedure are examined before the blocks of the called procedure.

Now again with reference to FIG. 3, the modification of the RTL linked code 52 for optimization purposes is performed during the next phase of optimizing linker 50 by the optimizer 56. Specific examples of optimization which will be described are: loop invariant code motion, and inter-procedural "dead code" elimination. Both operations require the results of the liveliness analysis.

For example, by moving invariant code, the number of instructions executed in the loop is reduced to improve performance. The precise information expressed in the sets LIVEIN(B) 558 and LIVEOUT(B) 559, the flow graphs 200 and the call graph 300 state precise variable utilization in context of the entire program 20. Therefore, opportunities for reducing the number of registers used are more numerous than would be possible with traditional optimizing compilers. Moreover, optimizing the entire program 20 enables code motion across procedural boundaries.

Inter-procedural liveliness information allows for removing dead code which may not have been recognized by the compiler 30. An instance of such dead code removal is illustrated with respect to in FIG. 6. A procedure 104 incudes basic blocks 171–177, and a procedure 105 includes basic blocks 181–185.

Figure 6:
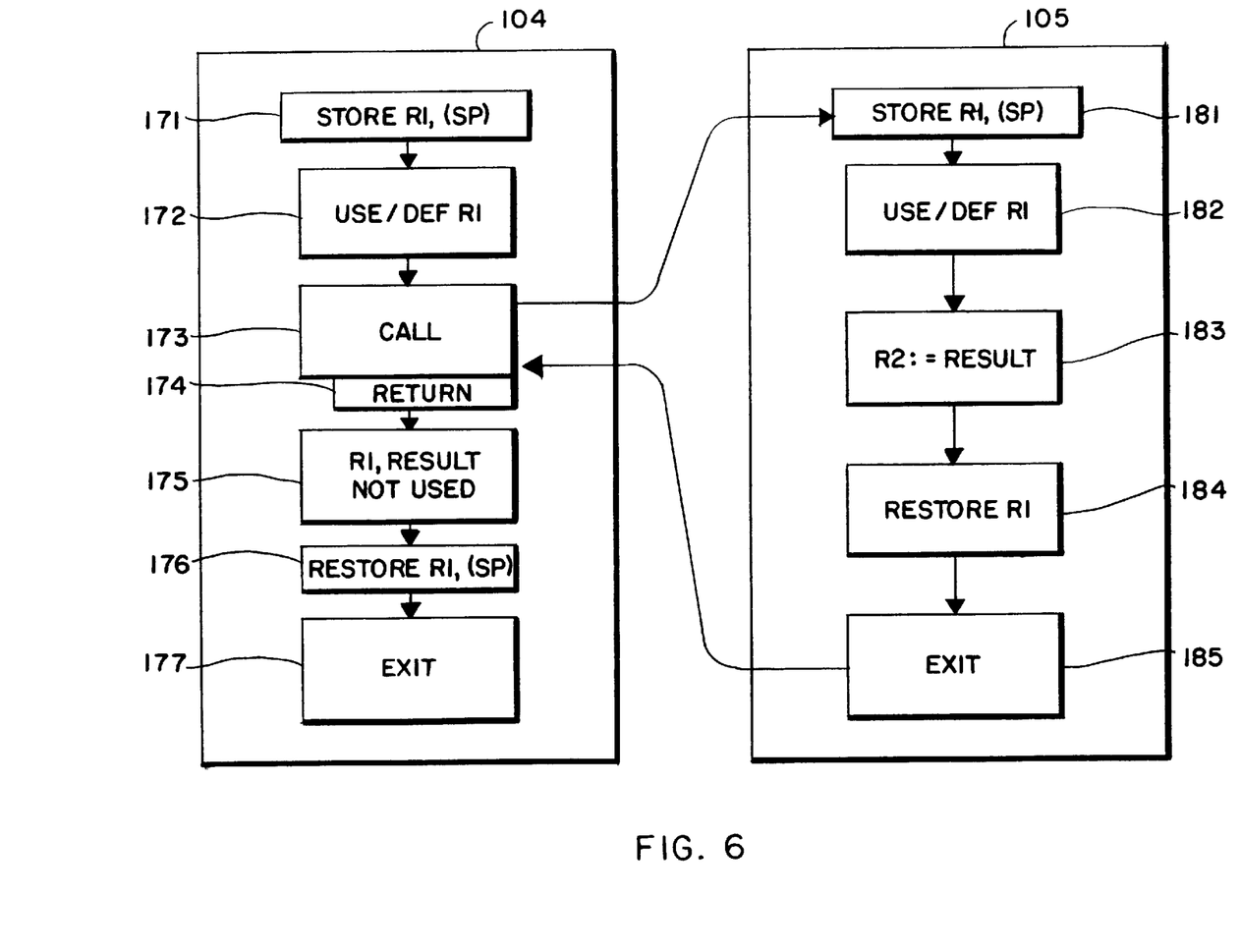
FIG. 6 is block diagram of procedures including dead code to be optimized.

In procedure 104, block 171 preserves the stored value of a register R1 in a stack indexed by the stack pointer register SP. Block 172 defines and uses register R1. Block 173 calls procedure 105. In procedure 105, block 181 preserves register R1 in the stack. Block 182 defines and uses R1. Block 183 generates a result in register R2. Block 184 restores R1 from the stack, and block 185 exits to the return block 174 of procedure 104.

Continuing in procedure 104, block 175 does not use R1 or the result stored in R2, block 176 restores register R1, and block 177 is the exit block of procedure 104. The compiler may have treated register R1 as a register to be preserved while executing in procedure 105, however register R1 is subsequently not used. Therefore, register R1 as determined by the liveliness analysis of the present invention is "dead" and instructions of procedure 105 which reference register R1, for example blocks 182, and 184 can be removed.

Similarly, procedure 105 returns an extraneous result in register R2. The generation of extraneous results is a common occurrence with a procedural high-level language such as C. Therefore, register R2 is also dead, and block 183 can likewise be removed.

To discover that the blocks 181–184, and perhaps the entire procedure 105 are dead, the liveliness information of the procedure 104 need to be available when the procedure 105 is examined for dead code removal opportunities. Traditional compilers would not have revealed these opportunities, since in traditional compilers the liveliness information only flows forward. In contrast, the liveliness analyses information, according to the present invention can flow in both directions.

Loop-invariant code which does not modify variables from one iteration of a loop to the next is another optimizing opportunity. Mechanisms which detect loops and recognize loop-invariant code are well understood for single procedures optimized by compilers. However, recognizing loops which can span an entire program, crossing procedure boundaries, are not completely visible to compilers which process object code modules one at the time.

Figure 7:
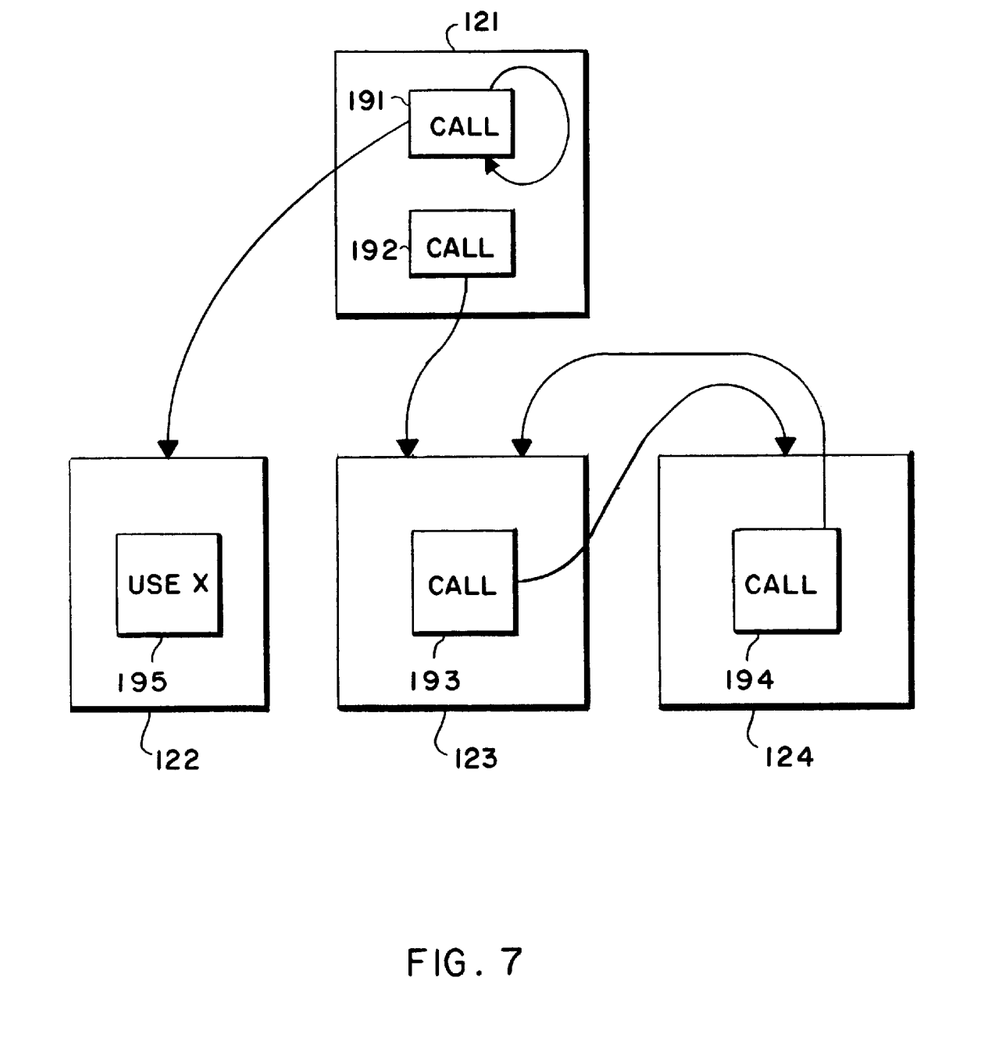
FIG. 7 is block diagram of procedures including invariant code to be optimized.

FIG. 7 shows two example of loops which can be optimized by the principles of the invention, and which would have gone undetected by known optimizing compilers. Procedures 121–124 include call blocks 191–194. The conjugate return blocks for the call blocks 191–194 are not shown. Procedure 122 is iteratively called from a loop in procedure 121 including call block 191. Procedure 121 also call procedure 123 via call block 192. Procedures 123 and 124 call each other.

Examining procedures 121 and 122 in isolation, as a compiler might do, will not disclose whether either of the procedures includes loop-invariant code which could be moved to a predecessor procedure. Similarly, code which is invariant in the recursive execution cycles of procedures 123 and 124 could also be moved to procedure 121.

Some compilers attempt to move invariant code across procedure boundaries by placing procedures in-line and executing code strictly sequentially. Unless cache behavior is considered when placing the procedures in-line, "in-lining" can have unpredictable and sometimes detrimental effects on the performance of the cache. Also, simple placing the procedures in-line can overwhelm existing compile-time optimizers, sometimes causing them to stop functioning, or confusing the optimization to the point that performance is actually degraded. Precise inter-procedural flow analysis according to the principles of the invention can avoid these problems.

For example, the present inter-procedural liveliness analysis looks across procedure boundaries and determine when registers are dead or unused for larger portions of the program. Invariant variables can be stored in these unused or dead registers. Instructions which load memory addresses are by definition invariant and obvious candidates for code motion.

The present invention solves several problems to enable loop-invariant code motion across procedural boundaries. For example, in the preferred embodiment, the full extent or span of each loop is determined. All the procedures which are included in the span of an inter-procedural loop are called the "loop-region."

Traditionally, loops are identified as a set of program components which are tightly coupled by execution control and dominated by another external program component. This approach does not make sense here. The bi-directional flow of liveliness information of the preferred embodiment, that is, along the call edges and along the return edges would result in many "false" loops that are invalid during actual execution. Control can not follow these paths. The summary information collected by the liveliness analysis can be used to filter data flow over these edges. The methods of the present invention correctly find loops which span several procedures, while excluding components of the program which are not dominated by the entry point to the loop.

The problem of finding inter-procedural loops is solved by studying the execution path of the entire program in a top-down manner. This is done by concentrating on the program call graph 300 instead of the procedure flow graph 200. First, all "heavy" or dominating procedures are identified. A heavy procedure could be any procedures that is visited, for example, more than once during execution.

The procedure and the call block which transfer execution to the heavy procedure are designated to be a loop header procedure, and loop header call block, respectively. Next, an attempt is made to move loop-invariant basic blocks from the heavy procedure, or successor procedures reachable from the heavy procedure, across the header block, and into the header procedure. Thus, loop-invariant code can migrate from procedure to procedure until it is pushed out of the loop. Of course, all procedures through which the invariant code migrates must be dominated by the header procedure to ensure that available or "free" registers are not violated by some procedure calling into the loop region extraneously.

Figure 8:
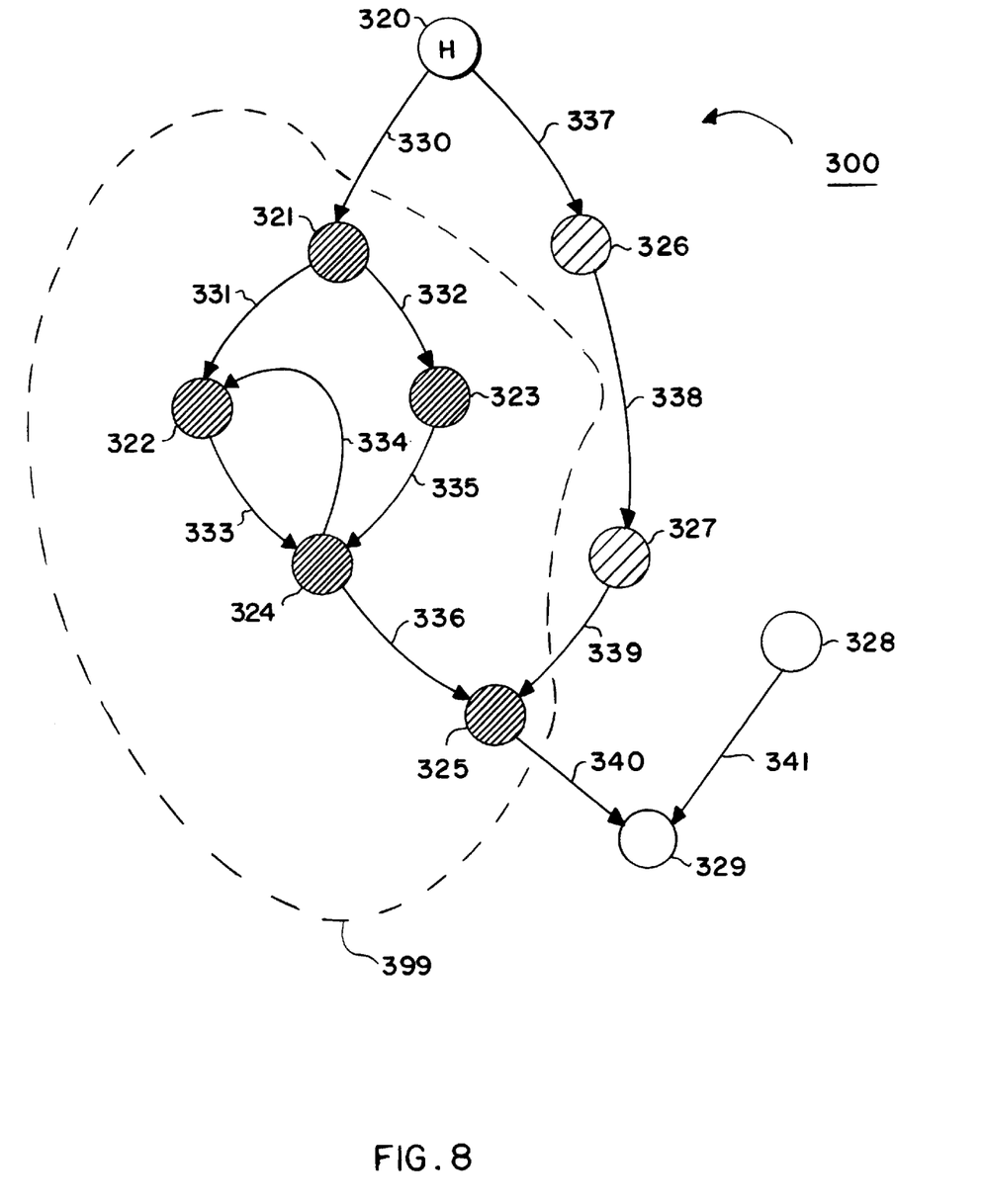
FIG. 8 shows a call graph for a program to be optimized.
Figure 9:
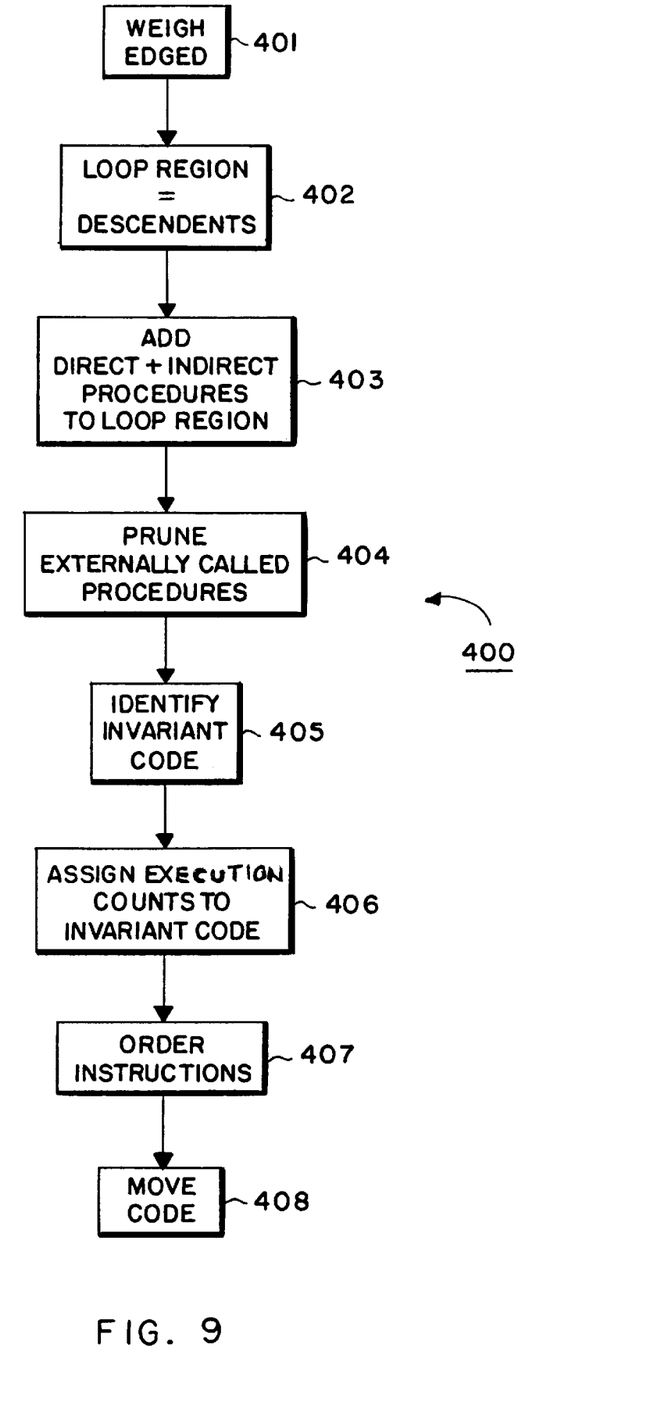
FIG. 9 is a flow diagram of a procedure to find a loop region of the program of FIG. 8.

FIG. 8 shows a program having procedures 320–329 calling each other as defined by a program call graph 300 having calling edges 330–341. The procedures of the program are indicated by the circles, and the call graph 300 is indicated by the directed arrows. FIG. 9 shows a process 400 that can be used to find loop regions of the program.

Now with reference to both FIGS. 8 and 9, in step 401, each of the edge 330–341 is weighted by an estimate of the number of times that the execution path will cross the edge. These estimated weights are derived from instruction iterations and recursions. To estimate the weight of an edge, the weight is first set to zero. For each call to a successor procedure, add ten raised to a power which is equal to the number loops which contain the calling side of the edge, e.g., the call block. Then for each recursive call to the called successor procedure multiply the weight of the edge by ten. The weight of each of the edges is independently determined. The weight do not accumulate as the edges of the call graph 200 are followed. For example, the weight of edge 334 is independently computed from the weight of the surrounding edges 330, 331, 332, 333, 335, and 336.

Using the weighted call graph 300, in step 402 determine an initial loop region. A call edge with a large weight implies the presence of some loop region because the successor procedures are called repetitively by a dominating procedure. If the program call graph 300 were to have the form of a tree, the loop region of the tree would include the called procedure 321 and all its descendants, for example the procedures 321, 322, 323, 324, 325, and 329.

However, very few real programs have call graphs in the form of a tree. Therefore, additional steps must be taken to isolate the loop region. In step 403, any procedures, directly or indirectly connected to the calling procedure are added to loop region, for example, procedures 326 and 327 shown cross-hatched.

In step 404, any procedures in the loop region which are also called by procedures outside the loop region are pruned from the loop region. The remaining procedures are determined to be the loop region. An example of the procedure 400 is detailed in Appendix B in a form suitable for programming.

The resulting loop region, generally indicated by a broken line 399 may include procedures which include call blocks to transfer execution control to procedures outside the region, for example procedure 329. Such procedures are called step procedures of the loop region 399. Step procedures should be considered part of the loop region. However, since step procedures are reachable from outside the loop region it is not safe to migrate loop-invariant code across them.

Also, if the loop header procedure 320 does not dominate the loop region 399, the region is pruned so thoroughly that it only contains the header procedure 320 itself. In this case, any remnants of the loop are contained in the header procedure, and only the basic blocks of the header procedure 320 can become candidates of code motion. If the loop arose because the successor procedure called the "header" procedure recursively, then the header procedure contains no instructions eligible for moving.

After the boundaries of the loop region have been established, the next task is to identify all instructions which are invariant within the loop region, see step 405. For example, a frequently used type of instruction which is always invariant is a load-memory address into register operation.

In step 406, each candidate invariant instruction is assigned an estimated execution count. The execution count combines the number of machine cycles required to execute the instruction by the depth of the loop within the procedure and by the weight of the edges on the call graph edges leading to the procedure.

Next, in step 407, the candidate invariant instructions are ordered according to the combined execution counts. In step 408, those instructions which will yield the highest pay-back, e.g., instructions having higher execution counts, will be allocated to available registers in rank order, until the supply of available registers for the loop region is exhausted.

In the preferred embodiment of the invention, available registers are identified as follows. An available register can not be referenced anywhere in the loop region, except possibly the temporary use of the register to save and restore variables during the execution of the header procedure 320. An unreferenced register is available if it is dead at the exit block of the header procedure, or if it is dead at the exit block of the step procedures, or if it is unreferenced in any of the step procedures or their descendants.

For each available and identified register, the next heaviest loop-invariant instruction is removed from the loop region. Each removed instruction is replaced with a register-to-register copy instruction to ensure that the variable is stored in the correct location.

The process steps of identifying a loop region, weighing loop-invariant instructions, ordering the loop-invariant instructions, and identifying available registers to hold the variables of loop-invariant instructions are performed for each of the edges 330–341 of the program call graph 300 with a weight greater than unity.

After inter-procedural code has been moved, any loop-invariant code within a procedure is relocated. Even though a traditional optimizing compiler may already have move loop-invariant code within procedures of the object modules, there are advantages to be gained if this optimizing step is redone for the linked module 100.

First, the liveliness analysis of the optimizing linker 50 is substantially more precise than any analysis which could be performed by a traditional compiler 30. The optimizing linker 50 considers the entire program 20, the compiler 30 only deals with small portions of the program 20 at any one time. The link-time optimizer 50 can identify available registers which go unnoticed by the compiler.

Furthermore, the allocation of available registers is fully integrated with the process of moving loop-invariant code. This permits the moving of very small pieces of invariant code, since the performance pay-back can only be realized if registers to store the result variables are available. The inter-procedural liveliness analysis provides these available registers.

After the inter-procedural code motion and after the intra-procedural code motion, the link-time optimizer 55 performs a clean-up process. Clean-up removes common sub-expressions, inter-procedural dead code, redundant instructions which save and restore variables, temporary register-to-register copy instructions, and any duplicate code portions of invariant code which were moved to the same area from different locations.

When the linked code module 100 is fully optimized, the procedures 101–103 are rearranged in a depth-first order. This heuristic rearrangement is intended to improve execution locality and hence cache behavior. The code generator 57, using the CPU description 9, can produce machine executable code 60 from the rearranged linked module 52. The machine code can be for any defined architecture, including the architecture presumed for the object modules 41–43.

The advantages of the claimed invention are particularly applicable to object code having loop-invariant code, and available registers. Since traditional compilers are hindered by the need to support separate compilations, and their own internal fragmentation, such occurrences are likely. The optimizing linker's ability to analysis the entire program at once, at the object code level, create optimizing opportunities to which the compiler would be blind.

The link-time optimizer according to the principles of the invention can deliver significant improvements in performance without simply cloning code and moving the cloned code in-line. Cloning code for in-lining purposes tends to greatly increase the size of programs. The link-time optimizer can perform execution flow and live variable analysis for the entire program without any input from the compiler. All high level program structure and processes knowledge is derived directly and solely from the object nodules, without any reference to the original source code.

Appendices A and B are attached which illustrate specific procedures of the inventions suitable for implementation in a computer system.

It will be apparent to those skilled in the art that various modifications can be made to the link-optimizer of the present invention without departing from the spirit and scope of the invention as set out in the appended claims.

APPENDIX A

Variable Liveliness Analysis Procedure

Stage I

Remove return edges and compute LIVE ("may be live") and DEAD ("must be dead") information for procedure B and with a successor procedure S.

Normal Blocks:
DEF[B]=variables defined by B before any use in B
USE[B]=variables used in B before any definition in B
LIVEIN[B]=USE[B] ∪ LIVEOUT[B]-DEF[B]
LIVEOUT[B]=$\cup_s$ LIVEIN[S] for all successors S of B
DEADIN[B]=DEF[B] ∪ DEADOUT[B]-USE[B]
DEADOUT[B]=$\cup_s$ DEADIN[S] for all successors S of B
Call and Return blocks.
LIVEOUT[call]=LIVEIN[entry] ∪ LIVEOUT[return]-DEADIN[entry]
LIVEOUT[retun]=$\cup_s$ LIVEIN[S] for all successors S of return
DEADOUT[call]=DEADIN[entry] ∪ DEADOUT[return]-LIVEIN[entry]
DEADOUT[return]=$\cap_s$ DEADIN[S] for all successors S of return
LIVEIN sets for a call or return block are identical to its LIVEOUT sets
When this converges, define, for cach procedure P:
  PUSE[P]=LIVEIN[B] where B is the entry to P
  PDEF[P]=DEADIN[B] where B is the entry to P
and then throw away the LIVE and DEAD sets computed in this phase.

Stage II

Restore return edges and delete call edges, and compute live (may be live) information for:

Normal blocks:
DEF[B]=variables defined by B before any use in B
USE[B]=variables used in B before any definition in B
LIVEIN[B]=USE[B] ∪ LIVEOUT[B]-DEF[B]
LIVEOUT[B]=$\cup_s$ LIVEIN[S] for all successors S of B
Calll and Return Blocks procedure P:
LIVEOUT[call]=PUSE[P] ∪ LIVEOUT[return]-PDEF[P]
LIVEOUT [return]=$\cup_s$ LIVEIN[S] for all successors S of return
LIVEIN sets for a call or return block are identical to its LIVEOUT sets.

APPENDIX B

Construction of an Interprocedural Loop

Input: A call graph C=(P,E) where P is the set of procedures and E is the set of call edges, a depth first spanning tree D of C, and an edge e=($p_h$→$P_e$)
Output: LoopRegion(e), a subset of the procedures of C.
A Method:
First, for LoopRegion ⊆ the decendants in D of $p_h$ build initial set of nodes reachable from $p_e$*
constant:Family={p/p is a descendant of $p_h$ in D}
LoopRegion={$p_h,p_e$}
while changes to set LoopRegion do
  for each p in family-{$p_h$}, in depth-first order, do
    if p ∈ LoopRegion then
      for each procedure q that p calls do
        if q ∉ LoopRegion and q ∈ Family then
          LoopRegion=LoopRegion ∪ {q}
Then, add callers of nodes already in region, if all callers are in the family
while changes to set LoopRegion do
  for each q in Family, in reverse-depth-first order, do
    if q ∈ LoopRegion then
      addcallers=true
      for each procedure p that calls q do
        if p ∉ Family then addcallers=false
      if addcallers then
        for each procedure p that calls q do
          if p ∉ LoopRegion then
            °LoopRegion=LoopRegion ∪ {p}
And, ensure that the loop region is dominated by a single entry point
while changes to set LoopRegion do
  for each q in Family-{$p_h$}, in depth-first order, do
    if q ∈ LoopRegion then
      for each procedure p that calls q do
        if p ∉ LoopRegion then
          LoopRegion=LoopRegion-{q}

I claim:

1. A computer implemented method for optimizing machine executable code during linking of object code modules corresponding to the machine executable code, said object code modules compiled from a plurality of source code modules, each source code module being in the form of a high level language, comprising the steps of:

translating said object code modules into a linked code module in the form of an intermediate language, said intermediate language having instructions independent of a particular computer system hardware architecture; and generating machine executable code compatible with a target computer system hardware architecture from said linked code module in the form of said intermediate language.

2. The method of claim 1 further including:

modifying said linked code module to optimize the execution of said machine executable code.

3. The method as in claim 2 including:

identifying a first set of instructions of said linked code module which will not be executed;

identifying a second set of instructions of said linked code module which compute values not used; and deleting said first and second set of instructions from said linked code module.

4. The method as in claim 2 including:

identifying a set of instructions of said linked code module which are to be executed repeatedly;

locating instructions of said set of instructions which do not change the state of the computer while said set of instructions are executed; and moving such instructions from said set of instructions.

5. The method as in claim 1 further including:

partitioning said instructions of said linked code module into a plurality of procedures, each procedure including instructions related for execution;

constructing a program call graph for said linked code module, said program call graph to indicate the flow of execution among said plurality of procedures; and applying said program call graph to said procedures to determine optimization opportunities in said linked code module.

6. The method as in claim 5 further including:

grouping instructions of each of said procedures into basic blocks, all instructions of a particular basic block to be executed if a first instruction of said particular basic block is executed;

constructing a procedure flow graph for each procedure, a particular procedure flow graph to indicate the flow of execution among said basic blocks of a particular procedure; and applying said particular procedure flow graph to said particular procedure to determine optimization opportunities in said particular procedure.

7. The method as in claim 6 further including:

for each basic block of said linked code module, analyzing said linked code module to generate a first set of variables which are live at the beginning of execution of each of said basic blocks and a second set of variables which are live at the end of execution of each of said basic blocks; and determining, in response to generating said first and second set of variables, an available register to use while optimizing said linked code module.

8. The method as in claim 7 further including:

in a first stage of said analyzing step, permitting liveliness information regarding said first and second set of variables to follow a forward flow of the execution path; and in a second stage of said analyzing step, permitting said liveliness information to follow a return flow of the execution path.

9. The method as in claim 8 further including:

in said first stage, analyzing said procedures and said basic blocks in a reverse-depth-first order; and in said second stage, analyzing said procedures in a depth-first order, and analyzing said basic blocks in said reverse depth-first order.

10. The method as in claim 5 further including:

identifying a specific one of said plurality of procedures as a dominating procedure if said specific procedure will be executed more than once;

identifying a particular procedure as a descendant procedure of said dominating procedure if said particular procedure is called from said dominating procedure, said descendant procedures and said dominating procedures being a loop region;

identifying said descendant procedure as a step procedure if said descendant procedure is called by any of said plurality of procedures other than said dominating procedure and said descendant procedure; and removing said step procedure from said loop region.

11. The method as in claim 10 including:

identifying specific instructions of said loop region as invariant instructions if said specific instructions do not change the execution state of the computer while executing said specific instructions of said loop region;

determining the number of times each of said invariant instructions will be executed;

sorting said invariant instructions by the number of times said invariant instructions will be executed; and moving said invariant instructions from said loop region in a sequence as determined by the sorted order of said invariant instructions.

12. In a computer system, a method for optimizing object code modules of a program during linking of the object code modules, said object code modules compiled from a plurality of source code modules from a program, each source code module being in the form of a high level language, comprising the steps of:

translating said object code modules into a linked code module in the form of an intermediate language, said intermediate language having instructions independent of a particular computer system hardware architecture;

modifying said linked code module to optimize the execution of the program; and generating machine executable code compatible with a target computer system hardware architecture from said linked code module in the form of said intermediate language.

13. The method as in claim 12 including:

identifying instructions of said linked code module which will not be executed; and deleting such instructions from said linked code module.

14. The method as in claim 13 including:

recovering source code structures from said linked code module;

partitioning said instructions of said linked code module into a plurality of procedures, each procedure including instructions related for execution;

constructing a program call graph for said linked code module, said program call graph to indicate the flow of execution among said plurality of procedures;

identifying a specific one of said plurality of procedures as a dominating procedure if said specific procedure will be executed more than once as determined by said program call graph;

identifying a particular procedure as a descendant procedure of said dominating procedure if said particular procedure is called from said dominating procedure, said descendant procedures and said dominating procedures being a loop region;

identifying said descendant procedure as a step procedure if said descendant procedure is called by any of said plurality of procedures other than said dominating procedure and said descendant procedure;

removing said step procedure from said loop region;

locating instructions in said loop region which do not change an execution state of the computer while the instructions of said loop region are executed; and removing such instructions from said loop region.

15. A method for optimizing compiled object code modules from a program, comprising the steps of:

linking said compiled object code modules; and subsequent to the start of said linking step, performing the following steps:

translating said compiled object code modules into an intermediate module having instructions independent of a particular computer system hardware architecture; and generating machine executable code compatible with a target computer system hardware architecture.

16. The method, as recited in claim 15, wherein said translating and generating steps are performed during said linking step.

17. The method, as recited in claim 15, further comprising the step of:

modifying said intermediate module to optimize the execution of the program.

18. The method, as recited in claim 15, further comprising the step of:

determining optimization opportunities in said intermediate module.

19. The method, as recited in claim 15, further comprising the step of:

applying a constructed program call graph to determine optimization opportunities in said intermediate module.

20. The method, as recited in claim 15, further comprising the steps of:

partitioning said intermediate module into a plurality of procedures; and performing optimization within and among said procedures.

21. The method of claim 1, wherein the translating step occurs independently of the compiling of the object code modules.

22. The method of claim 12, wherein the translating step occurs independently of the compiling of the object code modules.

23. The method of claim 15, wherein the translating step occurs independently of compiling of the object code modules.

* * * * *